S. J. BENNETT.
Animal-Trap.

No. 212,430.   Patented Feb. 18, 1879.

WITNESSES:
W. W. Hollingsworth
Amos W. Hart

INVENTOR:
S. J. Bennett
BY
ATTORNEYS.

UNITED STATES PATENT OFFICE.

SILAS J. BENNETT, OF HARRISON TOWNSHIP, DAVIESS COUNTY, MISSOURI.

IMPROVEMENT IN ANIMAL-TRAPS.

Specification forming part of Letters Patent No. 212,430, dated February 18, 1879; application filed December 10, 1878.

*To all whom it may concern:*

Be it known that I, SILAS JACKSON BENNETT, of Harrison township, in the county of Daviess and State of Missouri, have invented a new and useful Improvement in Animal-Traps; and I do hereby declare that the following is a full, clear, and exact description of the same.

My invention is an improvement in the class of gravitating or tilting platform-traps, for catching mice, rats, mink, and other animals.

My improvements relate to means for preventing the platforms from tilting until the animal has advanced to or near their inner ends; also, to means for returning the platforms to place after having been tilted, and for preventing noise from contact of the same with the stops which arrest such return movement; also, to means for holding and protecting the bait; also, to a detachable connection between the platforms and frame of the trap proper, all as hereinafter described.

Figure 1:
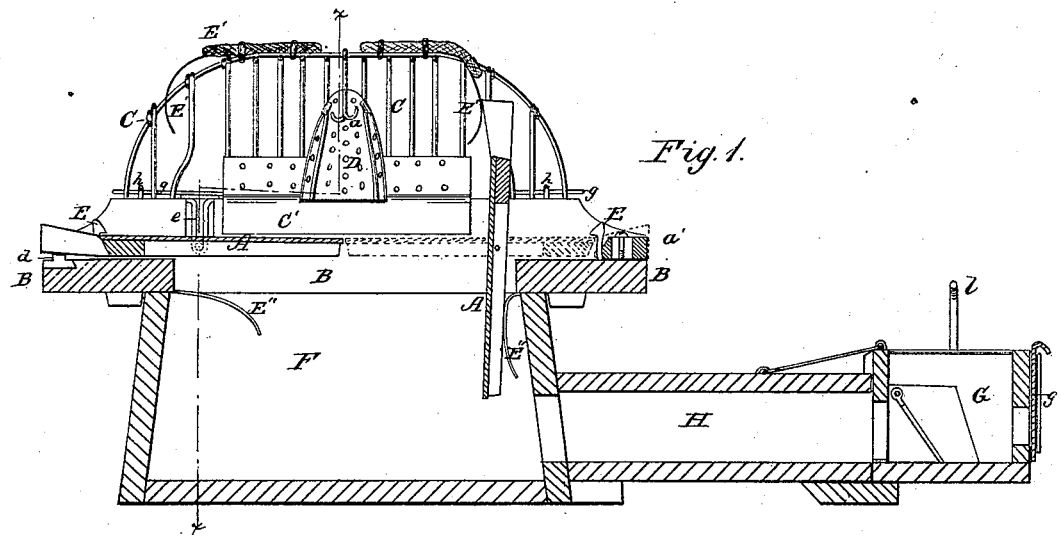
Figure 2:
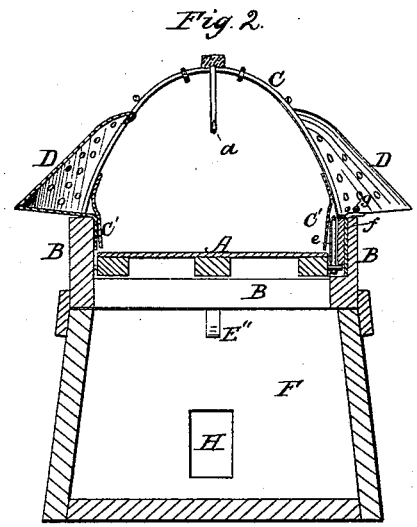
Figure 3:
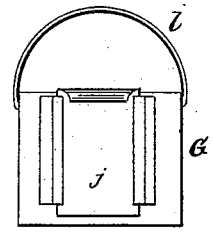
Figure 4:
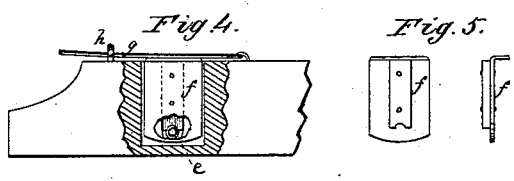
Figure 5:
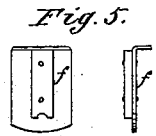

In the accompanying drawings, forming part of this specification, Figure 1 is a longitudinal central vertical section of the trap. Fig. 2 is a vertical cross-section on line $x\ x$ of Fig. 1. Figs. 3, 4, 5 are detail views.

The main parts of the trap proper are the tilting platforms A A, which are pivoted in the frame B; the wire guard C, placed over said platforms, and provided with side receptacles D, for holding bait; the spring-catches E, for holding the platforms horizontal until the animal reaches the inner ends of the platforms; the springs E' E", for returning the platforms to their original or horizontal position after having been tilted, and the devices which prevent the platforms from being accidentally displaced, and yet permit their detachment when required.

The supplementary portion of the trap consists of the box F, on which the aforesaid frame may be placed, and the separate and detachable cage G, into which the animal which has been precipitated into box F may pass through the passage or tube H.

I attach perforated metal plates C' to the inner sides of frame B, so that they project over the sides of the platforms. Their chief function is to prevent the animals trapped for from crawling along the sides of the frame to the bait, and from clinging to the frame B when the platforms tilt. They also hide the joint or space between the sides of the platforms and the frame. The perforations allow light from the outside to pass through the plates.

The guard C serves as a support for the bait-hook $a$, and also for the springs E', and prevents the animals trapped from obtaining access to the bait from above and compels them to pass onto and over the platform for that purpose, in doing which they cannot escape capture.

The side pockets or receptacles D are designed to hold and store bait, which is of such kind and quantity that it cannot well be attached to the hook $a$.

The catches E, which engage the outer edge of the platforms, are made sufficiently stiff to enable them to hold the platforms horizontal until the animal has approached near the inner end of the platforms, and then, suddenly yielding, they will allow the platforms to tilt so suddenly as to afford no time for the animal to escape. Of course, the stiffness of the springs will be varied according to the size of the trap and the animal being trapped for.

The catches E are attached to slotted slides $a'$, that are secured by screws to the frame B. The slides $a'$ can be adjusted to change the hold of the catches E on the platform, so that the latter will tilt under less or more weight or pressure.

In place of using slides $a'$, I may attach the catches to metal clasps, which are in turn attached to such slides.

When the platforms A tilt their outer ends strike against the springs E', attached to the guard C, and their inner ends upon the springs E", located beneath the platforms. The effect of this is that the platforms are thrown quickly back to their normal position. To prevent a loud noise being made by contact of the same with the ends of the frame B, I attach elastic cushions $d$ to the latter, as shown in Fig. 1.

To enable the platforms to tilt easily by relieving their pivots of all undue friction, and to enable the platforms to be detached when required, they are pivoted in vertical wire loops $e$. To detach the platforms, they are tilted, and then raised vertically. To prevent accidental displacement of the platforms by the animals in box F jumping up against them, I employ stops $f$, which slide in vertical grooves opposite the wire loops $e$, and are held down on the platform-pivots by levers $g$, whose free ends catch under hooks $h$.

When an animal has been precipitated into the box or cage F, he will naturally seek to escape, and, perceiving the light through the tube H, will pass along the tube, and thus enter the outer prison-box or chamber G, from which he can find no way of egress. The said prison-box has a hinged grating and a sliding door, $j$, through which the animal can be allowed exit when desired, and it has also a bail, $l$, which adapts it to be transported, with its imprisoned occupant, to any convenient place for release or destruction of the latter. The prison-box is attached to the tube H by a dovetail joint, so that it may be readily detached. The tube H is likewise made detachable from the box F, to facilitate packing, transportation, &c., of the trap.

If desired, the frame B and its immediate attachments may be used alone—that is, without the box F, tube H, and cage G. In such case said frame is placed on a barrel, box, or water-tank.

In using the trap, a temporary approach to the trap may be made by placing a board inclined and resting on the frame B; or the trap may be partly buried in corn, oats, hay, or other material.

By use of the tube H the prison G is placed at sufficient distance from the trap proper to prevent the animals which have been caught from alarming others which may approach the trap.

The box F, tube H, and prison or cage G may be used alone as a trap when desired.

I aware that bait pockets or holders have been located within the sides of an imperforate hood or cover of a trap, and that springs have been arranged beneath pivoted platforms, for the purpose of returning the latter to their original position after tilting; also, that the pivots of tilting platforms have been confined in open sockets by means of plates arranged horizontally; and these I do not claim.

What I claim is—

1. In an animal-trap, the combination of the wire or open-work guard or hood C with the tilting platforms A and bait holders or pockets located in the sides of the hood and opposite the inner ends of the platforms, substantially as shown and described, whereby the animal is enabled to see the bait through the hood, so that he is attracted thereby, but cannot gain access to it except by passing over one of the platforms.

2. In an animal-trap, the combination of the springs $E''$ and $E'$ with the tilting platforms and the frame B and guard C, to which said springs are respectively attached, and the elastic cushions $d$, as shown and described.

3. In an animal-trap, the spring-catches E, in combination with the tilting platforms, substantially as shown and described.

4. The combination, with the platforms, of the catches E and the adjustable slides $a'$, as and for the purpose specified.

SILAS JACKSON BENNETT.

Witnesses:
WM. M. TROSPER,
FILLMORE REED.